(12) United States Patent
Boeck et al.

(10) Patent No.: US 6,582,249 B1
(45) Date of Patent: Jun. 24, 2003

(54) APPARATUS FOR CONTACTING FOIL CONDUCTORS, IN PARTICULAR OF A SOLAR MODULE

(75) Inventors: Werner Boeck, Gross-Umstadt (DE); Klaus-Peter Goetz, Lorsch (DE); Guenter Feldmeier, Lorsch (DE); Heinz Scherer, Bensheim (DE); Martin Szelag, Bickenbach (DE); Andreas Woeber, Kronau (DE)

(73) Assignee: Tyco Electronics AMP GmbH, Langen (DE)

( * ) Notice: Subject to any disclaimer, the term of this patent is extended or adjusted under 35 U.S.C. 154(b) by 0 days.

(21) Appl. No.: 09/715,590

(22) Filed: Nov. 17, 2000

(30) Foreign Application Priority Data

Nov. 17, 1999 (EP) ............................................. 99122852

(51) Int. Cl.[7] .............................................. H01R 12/24
(52) U.S. Cl. ........................ 439/492; 439/936; 439/276
(58) Field of Search ................................ 439/492, 535, 439/427, 428, 429, 119, 781, 67, 493, 296, 936, 499, 276

(56) References Cited

U.S. PATENT DOCUMENTS

| | | | | | |
|---|---|---|---|---|---|
| 4,310,211 A | * | 1/1982 | Bunnell et al. | .............. | 136/244 |
| 4,460,232 A | * | 7/1984 | Sotolongo | ................... | 439/523 |
| 4,484,792 A | * | 11/1984 | Tengler et al. | .............. | 439/482 |
| 5,273,449 A | * | 12/1993 | Mattis et al. | ................ | 439/141 |
| 6,004,166 A | * | 12/1999 | Cardas | ........................ | 439/781 |
| 6,227,900 B1 | * | 5/2001 | Heise | .......................... | 439/276 |

* cited by examiner

Primary Examiner—P. Austin Bradley
Assistant Examiner—Edwin A. Léon

(57) ABSTRACT

An apparatus for making contact with a foil conductor, in particular of a solar module, the apparatus having a housing, a first connecting region for connecting to the foil conductor, and a second connecting region with at least one contact for connecting at least one plug connector. At least one conductor rail connects the contact to the foil conductor. The conductor rail has a contact region for detachable connection to the foil conductor. The conductor rail has a terminal area for receiving electronic modules, for example a diode or lead portions. Each conductor rail is connected to the contact of the second connecting region.

24 Claims, 10 Drawing Sheets

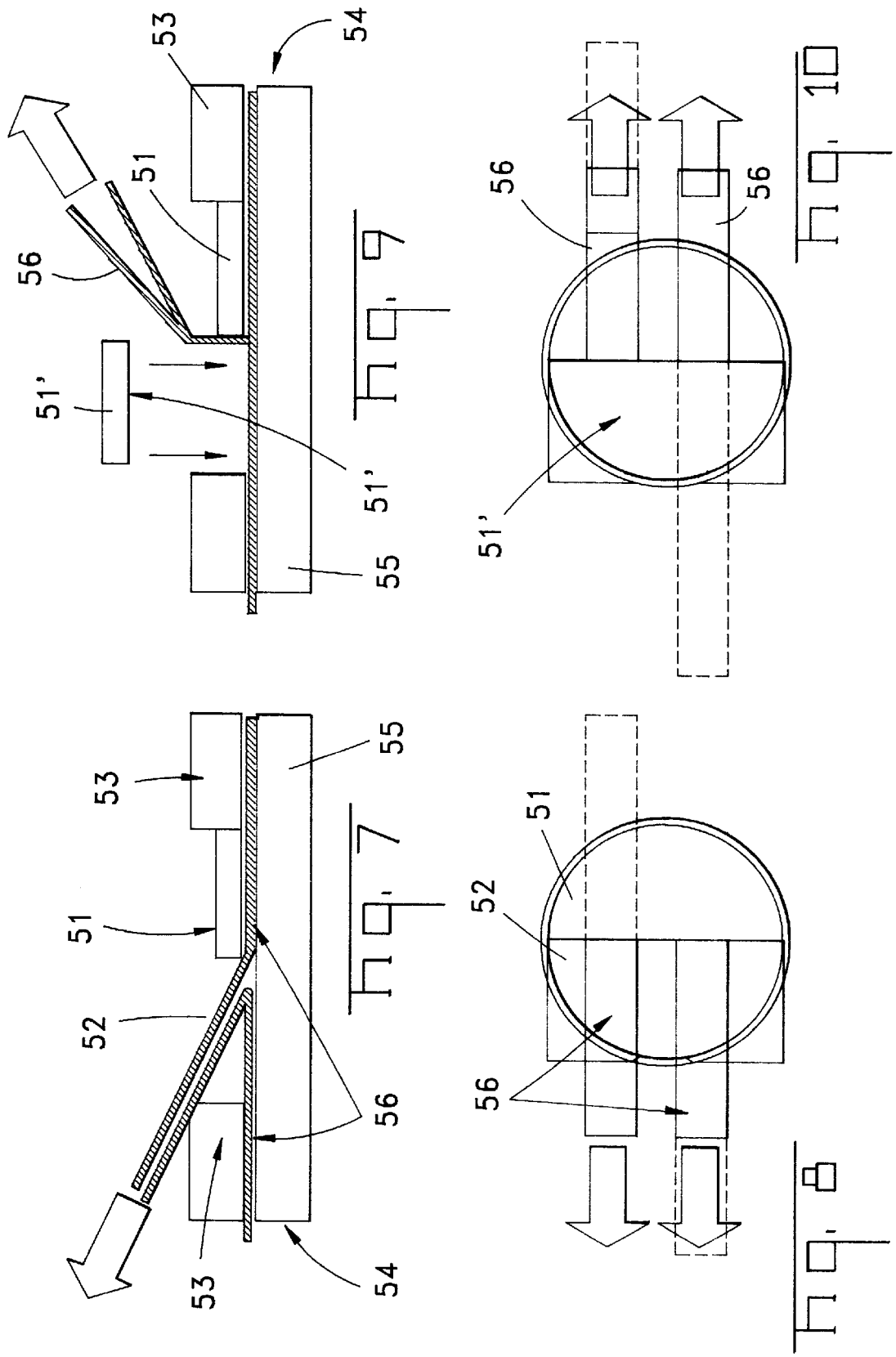

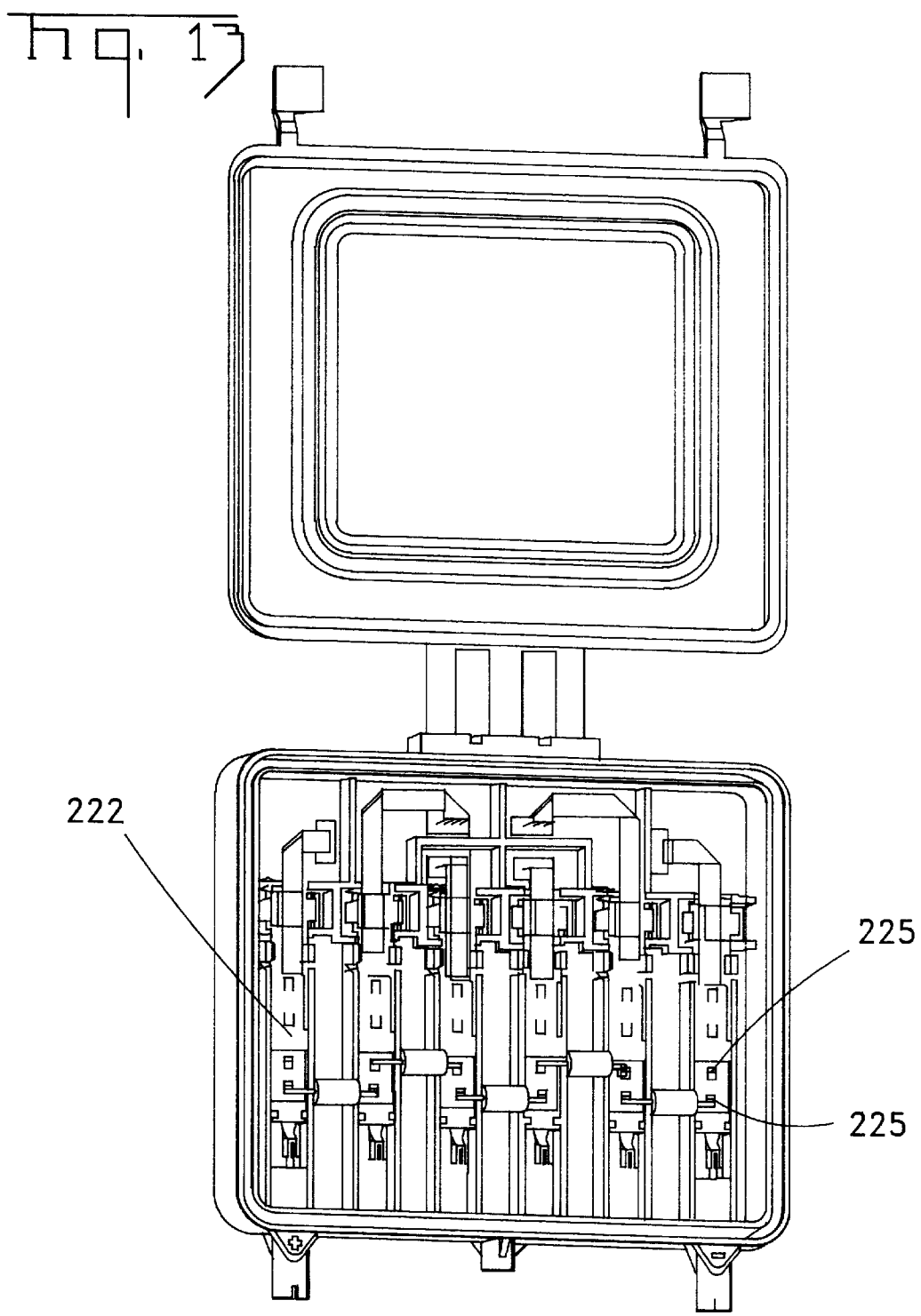

APPARATUS FOR CONTACTING FOIL CONDUCTORS, IN PARTICULAR OF A SOLAR MODULE

BACKGROUND OF THE INVENTION

The invention relates to an apparatus for making contact with foil conductors, in particular those of a solar module, the apparatus having a housing, a first connecting region for connecting to the foil conductors and a second connecting region with at least one contact for connecting to at least one plug connector.

DESCRIPTION OF THE PRIOR ART

To make contact with a solar module or solar panel it is necessary to make contact with foil conductors that are usually guided between two glass sheets. In many applications, the foil conductors emerge through a hole in the two glass sheets. The thickness of the glass sheets with the hole typically varies between three and five millimeters. A connection, which is sealed against water spray, is made at the hole. It is known to seal the hole in the glass sheet with a sealing compound and to glue a housing of an apparatus for making contact with the foil conductors thereto. The disadvantage of this process is that the labour input is very high and the sealing process only achieves a seal against the glass sheets. Thus, different glass thicknesses lead to varying installation conditions.

SUMMARY OF THE INVENTION

It is an object of the invention to provide an apparatus for making contact with foil conductors, such as those of a solar module, that is of simple and easy construction.

This object is achieved by an apparatus for making contact with a foil conductor, in particular of a solar module, that has a housing, a first connecting region for connecting to the foil conductor and a second connecting region with at least one contact for connecting at least one plug connector. At least one conductor rail connects the contact to the foil conductor. The conductor rail has a contact region for detachable connection to the foil conductor. The conductor rail has a terminal area for receiving electronic modules, for example a diode or lead portions. The conductor rail is connected to the contact of the second connecting region.

As a result of the design of the apparatus according to the invention, it is possible to connect the foil conductors to the conductor rails which are connected to the contact in the connecting region of the apparatus for connecting at least one plug connector. A simple contacting of the solar module is thus achieved.

It is also particularly advantageous to close the housing with a diaphragm cover. As a result, variations in pressure inside the housing, due to varying external temperatures or varying external pressure, can be compensated.

It is also particularly advantageous that the diaphragm cover is securely connected to the housing. This is achieved by the diaphragm cover being joined to the housing by a strap hinge. The diaphragm cover is made of a flexible material, different from the material of the housing, so that the hinge is connected to the housing via a latching connection.

It is also particularly advantageous that the diaphragm cover simultaneously seals and closes the housing of the apparatus. This is achieved by a sealing lip which engages in a corresponding groove of the housing.

It is also particularly advantageous that the diaphragm cover is easy to open. This is achieved by an opening aid into which a tool can be inserted so that the cover can be easily opened by a levering action of the tool.

It is also particularly advantageous that an intermediate cover is provided to prevent touching of the current-carrying contacts. The intermediate cover is arranged between the housing and the cover to cover the conductor rails. It is also particularly advantageous that the terminal areas for receiving electronic modules are accessible when the intermediate cover is inserted.

It is also particularly advantageous that the housing is filled to the intermediate cover with sealing compound.

It is also particularly advantageous that the intermediate cover can not be detached from the housing after the housing is sealed. This is achieved by a latching hook which fastens the intermediate cover to the housing so that it is also sealed. This measure ensures that once the apparatus has been fastened to the solar panel further manipulation is not possible.

It is also advantageous to make the sealing compound easy to insert. This is achieved by a sealing funnel that is provided on the intermediate cover.

It is also particularly advantageous that the foil conductors are very easy to fasten. This is achieved in that the contact regions of the conductor rails have clamping springs which enable the foil conductors to be clamped between the clamping springs and the conductor rails.

It is also particularly advantageous that it is possible to glue the housing onto the glass plate of the solar panel. This is achieved by having the first connecting region arranged on a base of the housing.

It is also particularly advantageous that the correct position of the housing on the solar panel can be assured by the aid of the housing. For this purpose, a centering ring is provided on the first connecting region for centering the housing in the recess of the upper glass plate of the solar module.

It is also particularly advantageous that a seal is provided between the solar module and the connecting region of the housing to assure a seal against water spray and enable adaptation for various glass thicknesses. A seal of this type can be achieved by means of a gel seal.

It is particularly advantageous that the gel seal can be applied into a recess of the solar panel. This is achieved when the gel seal consists of a carrier element and a gel element. This can also be achieved when the gel seal consists of two partial seals between which the foil conductors can extend.

It is also particularly advantageous that an adjusting spring having stored energy is provided to compress the gel seal for a lengthy period of time after the apparatus has been applied to the solar panel. This is achieved by the first connecting region including spring elements that exert pressure on the gel element.

It is also particularly advantageous to provide screw terminal connectors that allow direct connection of cables within the apparatus.

It is also particularly advantageous that the conductor rails of the system can be connected to one another as desired, whereby the apparatus can be adapted to the use of the solar module. This is achieved by each conductor rail having at least one terminal area for making contact with conductor portions or diodes.

With the apparatus according to the invention, the foil conductors can reliably be contacted and the housing is sealed against water spray. The apparatus also has high thermal stability and is weather-proof against UV radiation and ozone.

It is also particularly advantageous that the electronic modules, for example diodes, in the apparatus can easily be exchanged.

BRIEF DESCRIPTION OF THE DRAWINGS

FIG. 7 is a schematic view of the solar module with the foil conductors and the gel seal partially inserted therein;

FIG. 8 is a top view of the apparatus according to FIG. 7;

FIG. 9 is a schematic side view of a further stage during insertion of the gel seal into the solar module according to FIG. 7;

FIG. 10 is a top view of the apparatus according to FIG. 9;

FIG. 13 is a perspective view of the apparatus with six conductor rails.

DETAILED DESCRIPTION OF THE PREFERRED EMBODIMENT

Figure 1:
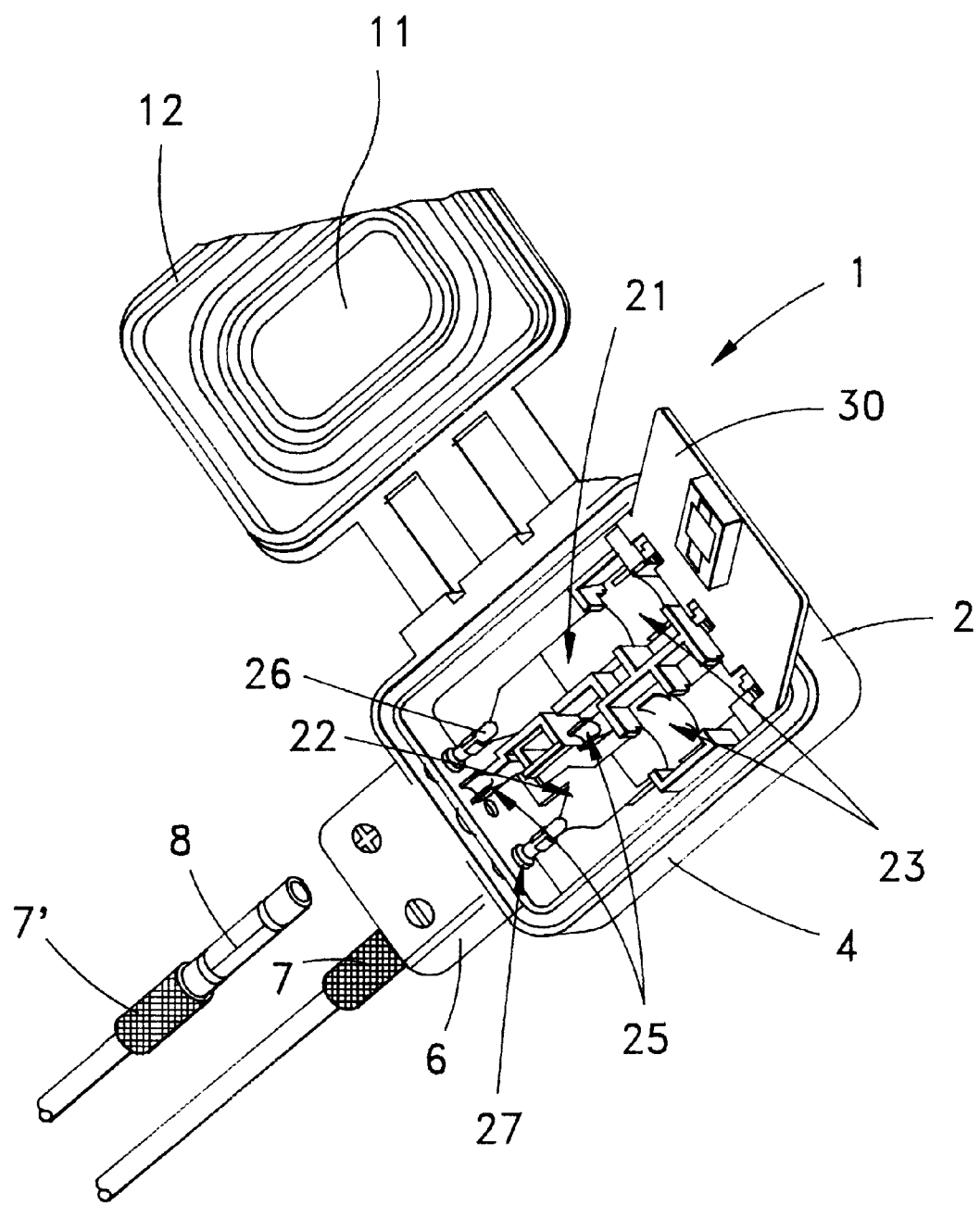
FIG. 1 is a partially cut-away upper perspective view of a first embodiment of an apparatus for making contact with foil conductors having an opened diaphragm cover and intermediate cover.
Figure 2:
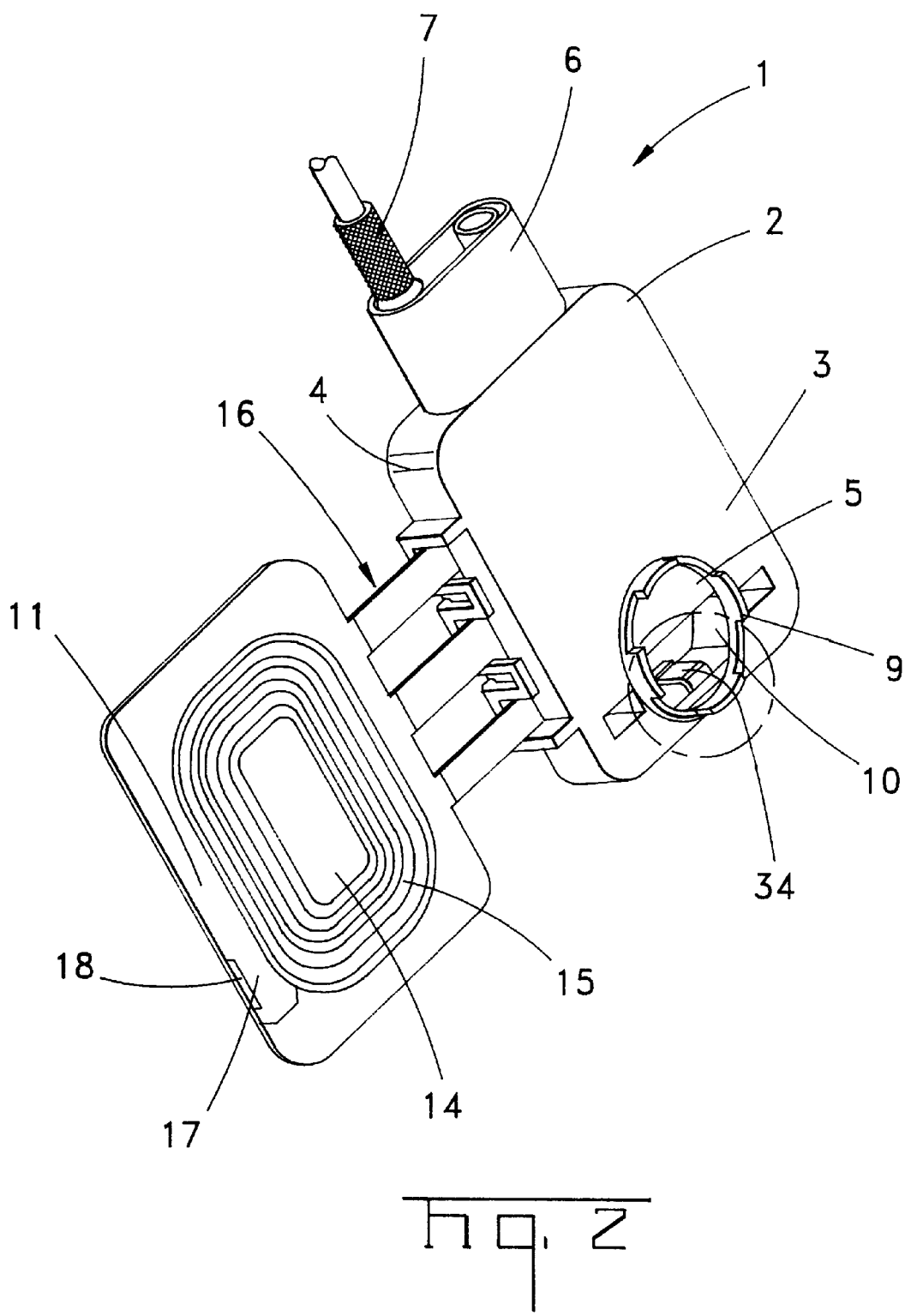
FIG. 2 is a lower perspective view of a first connecting region of the apparatus shown in FIG. 1.
Figure 3:
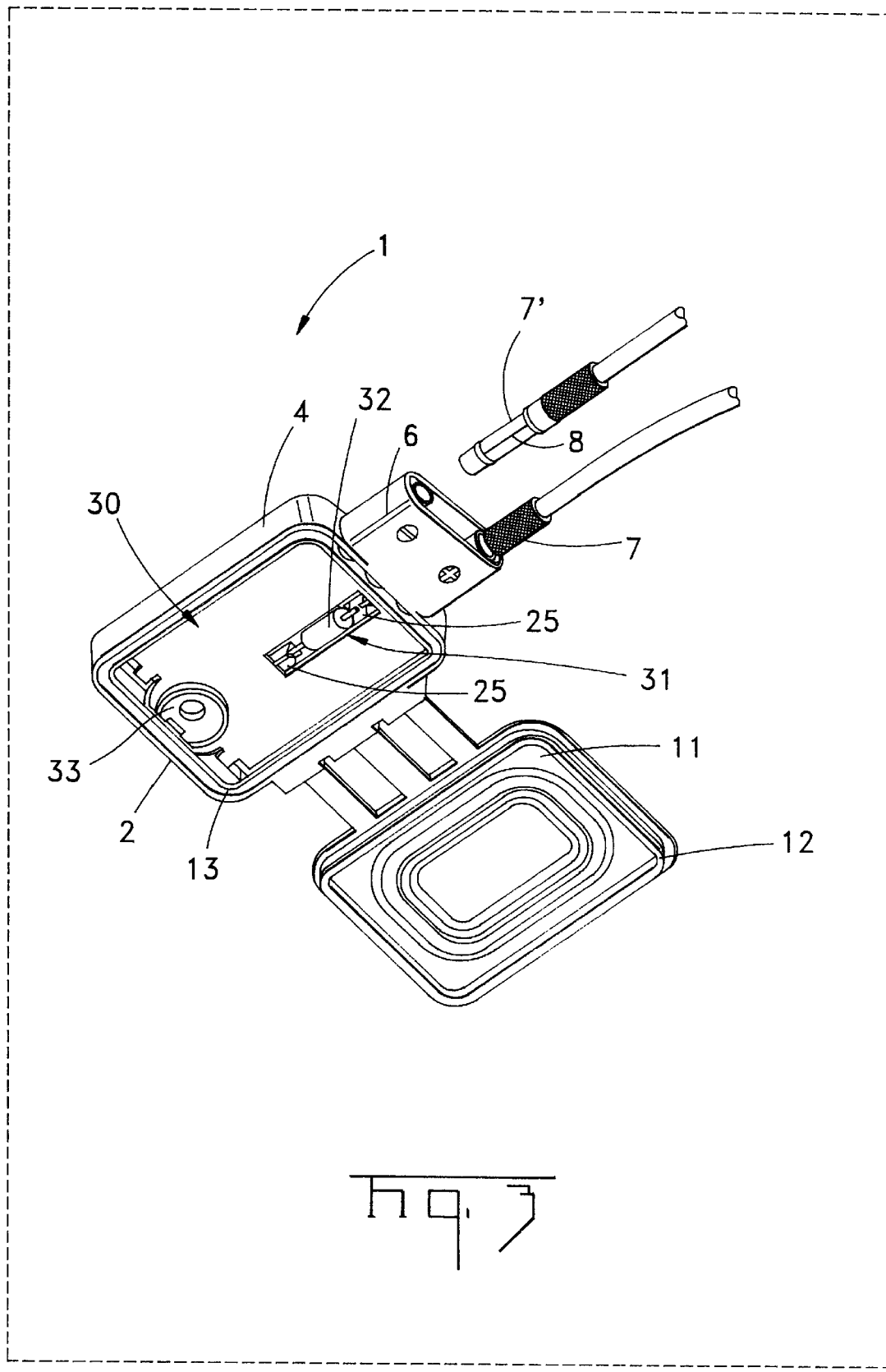
FIG. 3 is a further perspective view of the first embodiment of the apparatus with the intermediate cover and a diode inserted.

A first embodiment of an apparatus 1 according to the invention is shown in FIGS. 1–3. The drawings show various perspective views of the apparatus 1 according to the invention for making contact with foil conductors 41, such as those of a solar module 40. The apparatus 1 consists of a housing 2 with a base 3 and lateral walls 4.

The housing 2 has two connecting regions, a first connecting region 5, which is provided in the base 3 for making contact with the solar module 40 and a second connecting region 6 which is provided in a lateral wall 4 of the housing and is designed for connecting with at least one plug connector 7. As can be seen from the figures, two female plug connectors 7, 7' can be connected at the second connecting region 6. The two female plug connectors 7, 7' have coding ribs 8 for distinguishing the female plug connectors 7, 7' for plus potential and minus potential. A female contact is located inside the female plug connector 7, 7' in a safe-to-touch manner. By virtue of the coded socket housing it is not possible to mismate the female plug connectors 7, 7'. In the plugged state, the plugged connection between the second connecting region 6 and the female plug connectors 7, 7' is sealed against water spray.

The first connecting region 5 is arranged on the base 3 of the housing 2. The first connecting region 5 has a centering ring 9 which is used for centering the first connecting region 5 and, therefore, the housing 2 in an opening (see FIG. 6, reference 42) in a glass sheet 43 of the solar module 40. The first connecting region 5 has an opening 10 in the base 3 within the centering ring 9. The foil conductors 41 are inserted into the housing 2 through the opening 10.

A diaphragm cover 11 is provided on the housing 2. The diaphragm cover 11 has a peripheral sealing ring 12. The sealing ring 12 engages in a corresponding sealing groove 13 of the housing 2 when the diaphragm cover 11 is closed. The diaphragm cover 11 has, in a central region, a diaphragm 14 which, due to an undulating design of the material in the region 15 surrounding the diaphragm 14, is easily moveable relative to the diaphragm cover 11. When the diaphragm cover 11 is closed, the diaphragm cover 11 closes off the housing 2 in a sealing manner with the sealing lip 12. If there are temperature variations or corresponding changes in ambient pressure, pressure in the interior of the housing 2 can be compensated with the aid of the diaphragm 14. The diaphragm cover 11 has a hinge 16 in the form of three hinge straps. The diaphragm cover 11 is supported on the housing 2 by means of the hinge 16. As the diaphragm cover 11 is often produced from a different material from the housing 2, the diaphragm cover 11 can be connected to the housing 2 in a latching manner. The diaphragm cover 11 has an opening aid 17 into which a tool can be inserted into an undercut 18 so that with the aid of the tool, the diaphragm cover 11 can be opened.

Two conductor rails 21, 22 are located in the housing 2 of the apparatus 1 according to the first embodiment. The conductor rails 21, 22 each have a contact region 23 for detachable connection to a foil conductor 41. The contact regions 23 consist of metallic clamping springs that clamp the foil conductors 41 between the clamping springs and the conductor rails 21, 22. Reliable contacting of the foil conductors 41 is thus ensured by the use of purely metallic contact elements. In addition, contacting is achieved by energy stores in the clamping springs.

The conductor rails 21, 22 have a terminal area 25 for receiving electronic modules or lead portions. The terminal areas 25 are arranged opposite to one another so they can receive, for example, the lead portions of a diode. Each conductor rail 21, 22 is also connected to a contact 26 of the second connecting region 6. The contacts 26 are surrounded by an inner seal 27 which ensures the sealing of the contact 26 to the housing 2.

Between the housing 2 and the diaphragm cover 11, an intermediate cover 30 is provided. The intermediate cover 30 has a plurality of recesses 31 which serve to expose the terminal areas 25 through the intermediate cover 30. Thus, even when the intermediate cover is closed, an electronic component, for example a diode 32, is accessible for insertion and/or removal. The intermediate cover 30 also has a sealing funnel 33. By means of the sealing funnel 33, the space between the intermediate cover 30 and the housing 2 can be filled with a sealing compound. In addition, the intermediate cover 30 has a latching lever 34 for latching on the housing 2. When the space between the intermediate cover 30 and the housing 2 is filled with the sealing compound, the latching lever 34 is also sealed and the intermediate cover 30 can no longer be opened without destroying the apparatus 1.

If an apparatus 1 according to the invention as shown in FIGS. 1–3 is applied to the solar module 40, a seal is initially provided on the solar module 40 and the foil conductors are then inserted through the opening 10 of the first connecting region 5 into the housing 2. The base 3 of the housing 2 is glued onto the glass sheet 43 of the solar module 40. The foil conductors 41 are contacted by means of the clamping springs of the contact regions 23 with the conductor rails 21, 22. The intermediate cover 30 is then closed and the apparatus 1, already glued to the solar module 40, is sealed. The diode 32 can then be inserted and the diaphragm cover 11 of the apparatus 1 closed. Contacting of the solar module 40 is now possible with the plug connectors 7, 7'.

Figure 4:
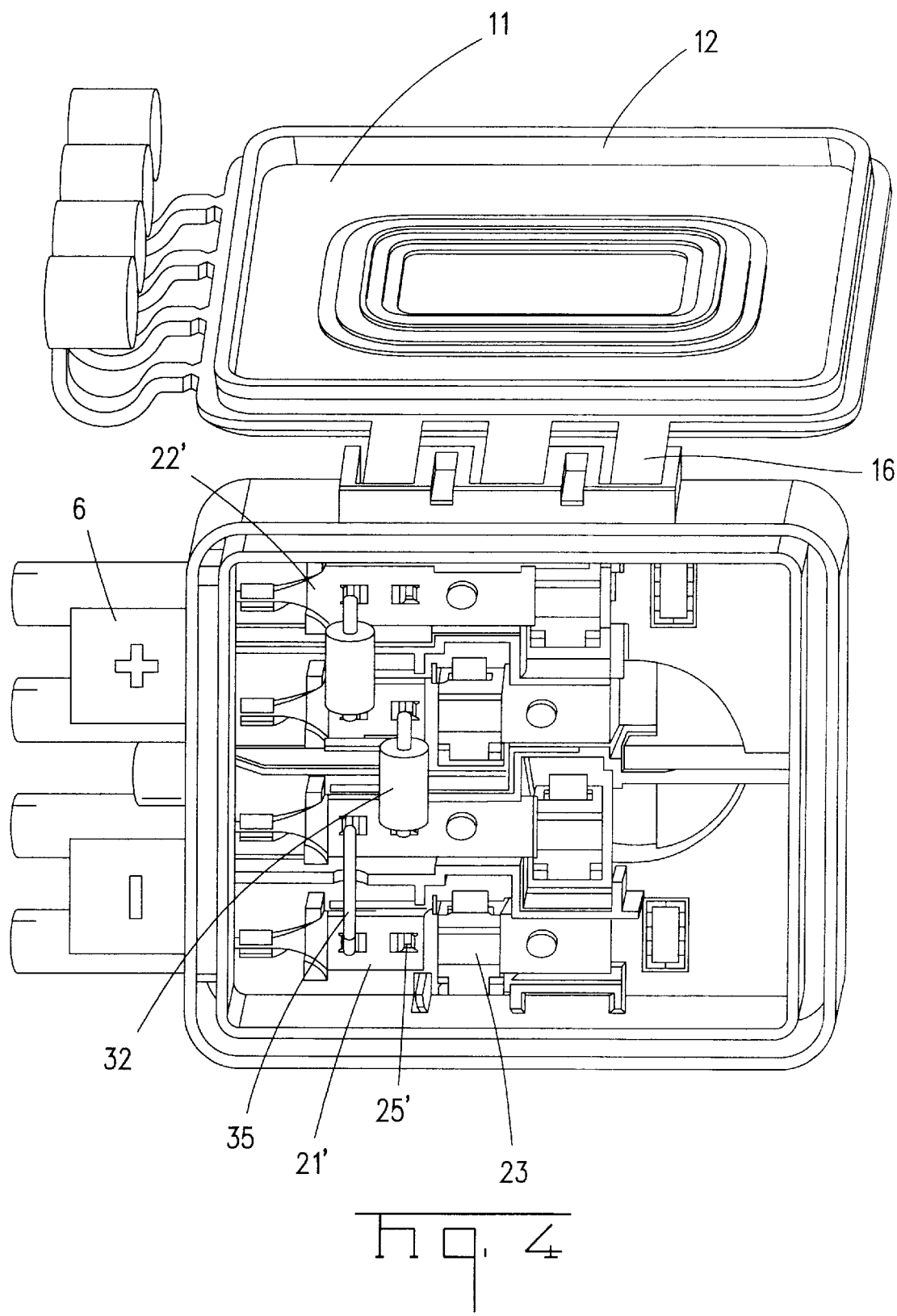
FIG. 4 is a perspective view of a second embodiment of the apparatus with the opened diaphragm cover.
Figure 5:
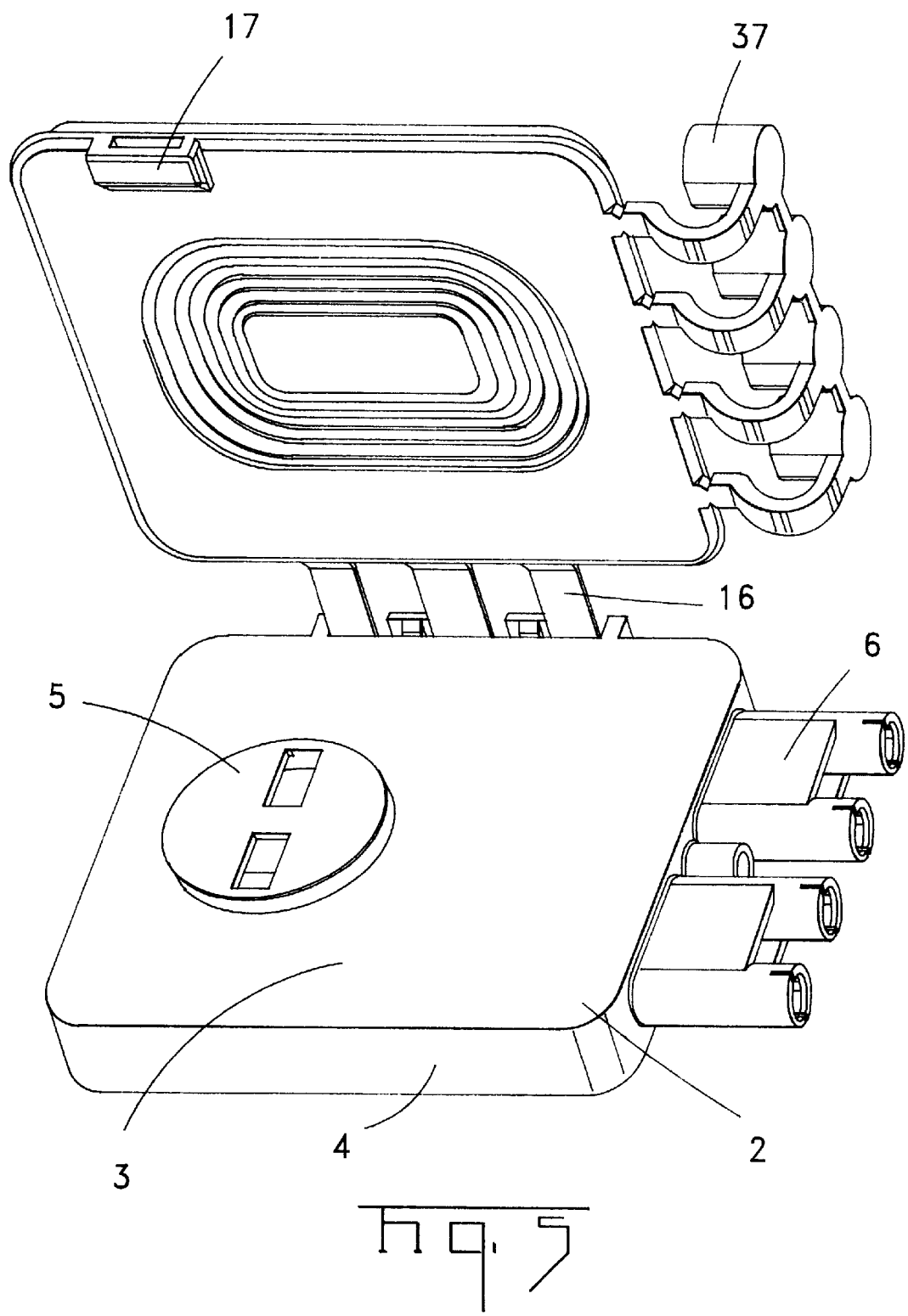
FIG. 5 is a perspective view from a base of a housing of the embodiment of FIG. 4.

FIGS. 4 and 5 show a second embodiment of the apparatus according to the invention. This embodiment essentially differs from the first embodiment in that not only two foil conductors 41 but four foil conductors 41 can be connected. In this apparatus, moreover, there is no intermediate cover 30. Each conductor rail 21', 22' has one or more terminal areas 25' for receiving and making contact with foil conductor ends, for example a diode 32 or a conductor portion 35. The conductor rails 21', 22' also have contact regions 23 with metallic clamping springs. The diaphragm cover 11 is also substantially designed to correspond to the diaphragm cover 11 of the first embodiment. The diaphragm cover 11 has a peripheral sealing lip 12, a hinge 16 and an opening aid 17. The diaphragm cover 11 also has covering caps 37 for covering the second connecting region 6 or the plug connector receivers of the second connecting region 6.

Figure 6:
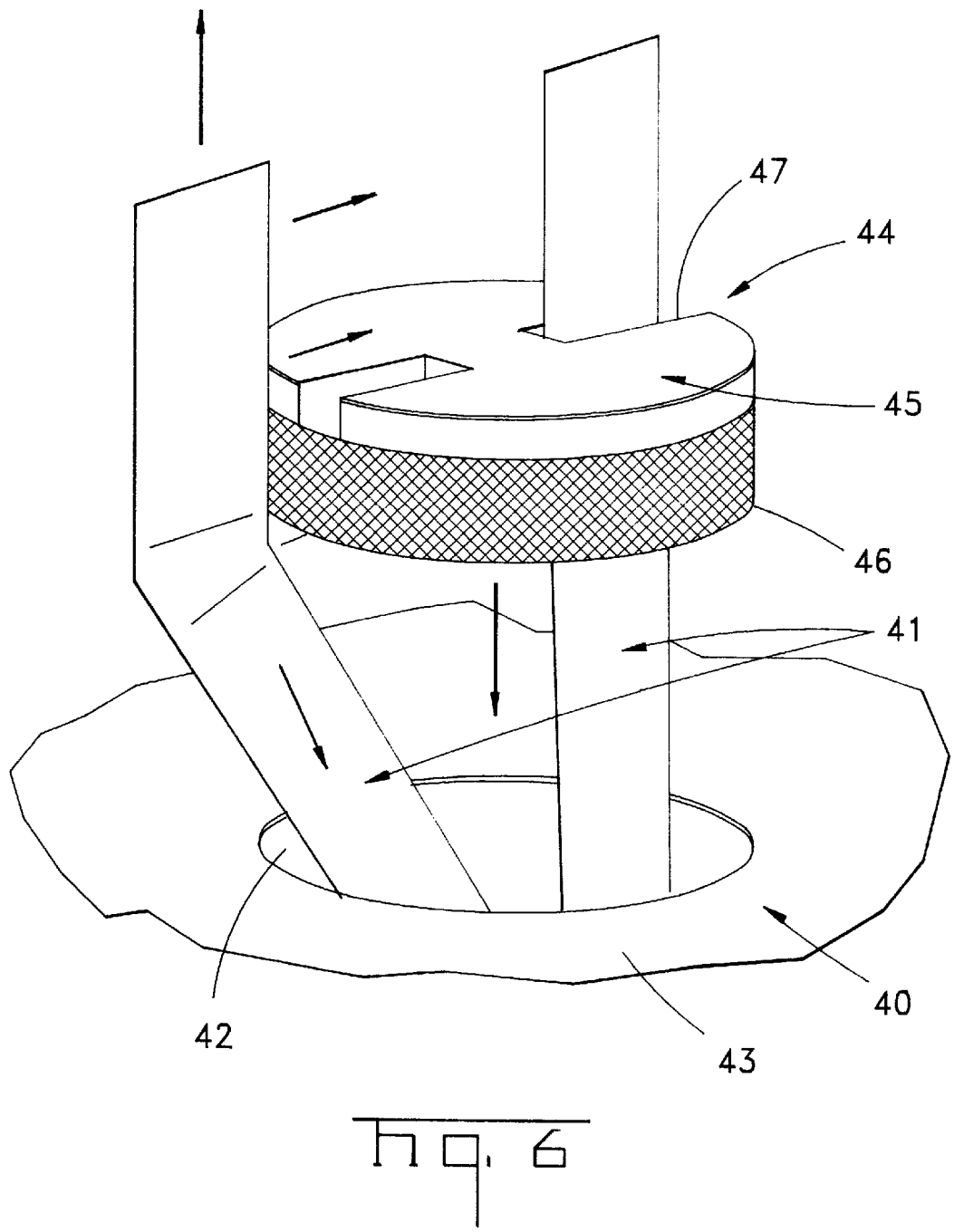
FIG. 6 is a schematic drawing of a solar module with the foil conductors and a gel seal.

A first possible design of a seal on the solar module 40 will now be described with the aid of FIG. 6. The solar module 40 has two foil conductors 41 which are guided through the opening 42 in the upper glass plate 43 of the solar module 40 out of the solar module 40 and into the apparatus 1. To seal the opening 42, a gel seal 44 is provided which is adapted in shape to the opening 42. The gel seal 44 consists of a carrier element 45 and a gel element 46 carried by the carrier element 45. The carrier element 45 has two slots 47 for receiving the foil conductors 41. The solar module 40 can be optimally sealed by means of the gel seal 44.

A second possible design of a gel seal will now be described with the aid of FIGS. 7–10. The second gel seal consists of two semicircular elements 51, 51', which are inserted into a semicircular opening 52 in a glass plate 53 of a solar module 54. Two foil conductors 56 are located between the two glass plates 53, 55 of the solar module 54. The foil conductors 56 are initially bent in a first direction to insert the first partial seal 51. The foil conductors 56 are then bent over the partial seal 51 to insert the second partial seal 51'. An optimal seal is also achieved with the two partial seals 51, 51'.

Figure 11:
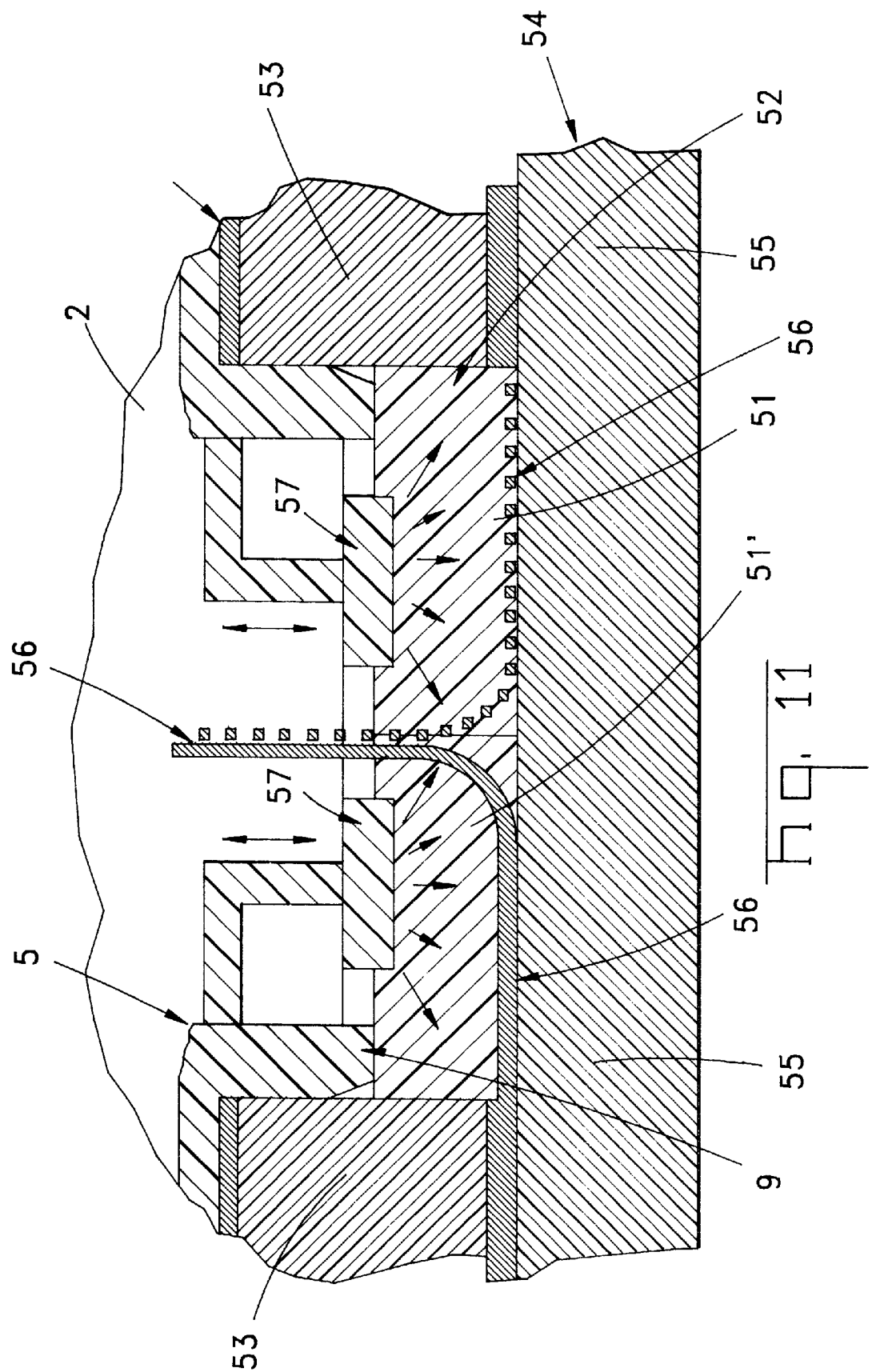
FIG. 11 is a cross-section through the solar module with the first connecting region of the apparatus applied thereto.

With the aid of FIG. 11, it will now be explained how a constant pressure is exerted on the gel seals 44 or 51, 51' to ensure the integrity of the seal. FIG. 11 shows a cross-section though the solar module 54 with the first glass plate 55 and the second glass plate 53. Two foil conductors 56 pass through the opening 52 in the second glass plate 53. The opening 52 is sealed by means of the two partial seals 51 and 51'. An apparatus 1 according to the invention is applied to the solar module 54. Only a part of the housing 2 can be seen. A cross-section through the first connecting region 5 with the centering ring 9 is shown. To exert a pressure on the partial seals 51, 51 ' of the gel seal, spring elements 57 are provided in the first connecting region 5 which are connected to the first connecting region 5 and spring-load perpendicularly to the extension of the glass plates 53, 55. Pressure is thus exerted on the gel seal and the sealing effect is ensured.

Figure 12:
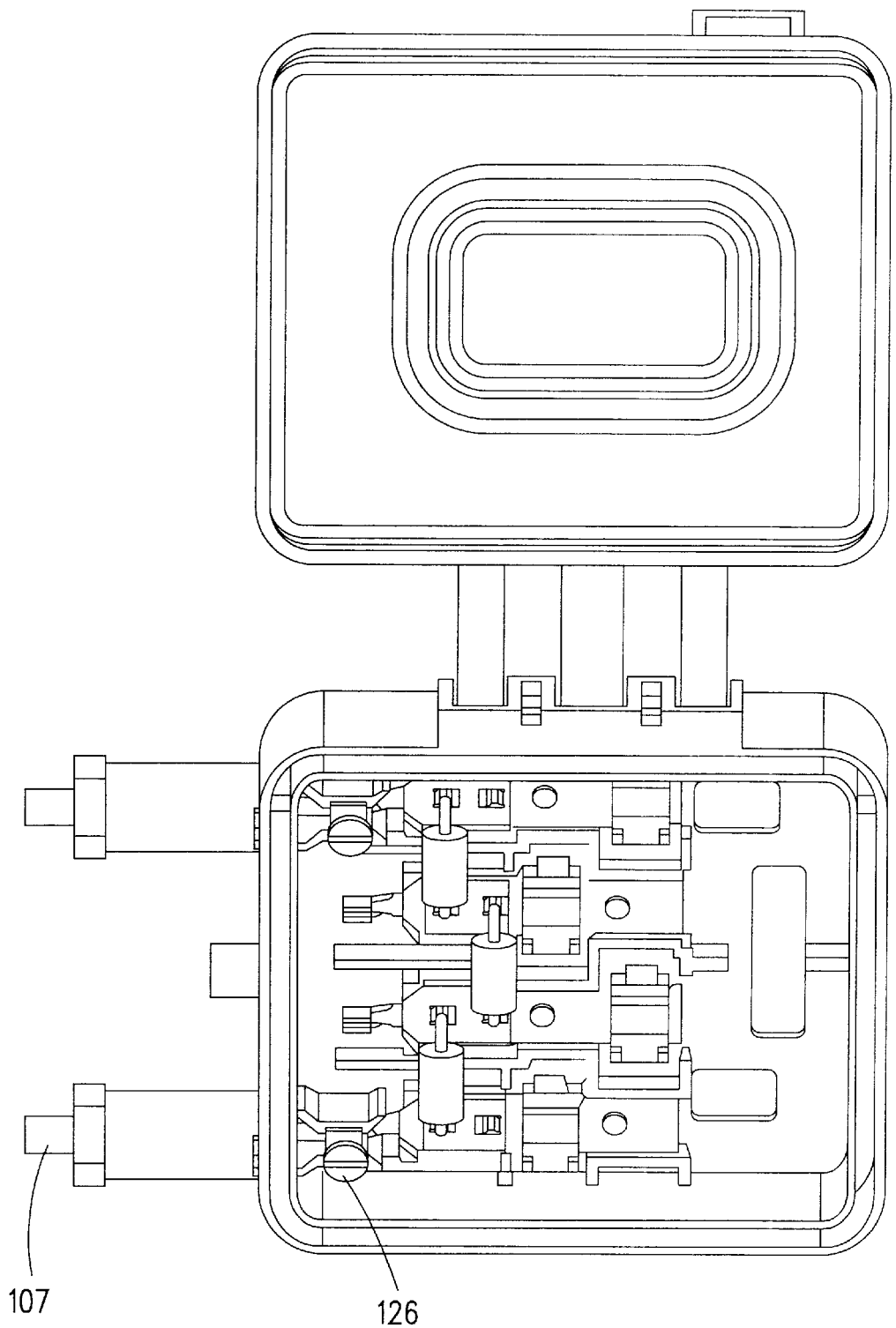
FIG. 12 is a perspective view of the apparatus with screw terminal areas and the opened diaphragm cover.

FIG. 12 shows a perspective view of the apparatus 1 with the opened diaphragm cover 11 which differs from FIG. 4 in that two screw terminal areas 126 are provided for making contact with a cable 107 in each case. In addition to the use of screw terminal areas 126, the use of spring-loaded terminals is also possible.

FIG. 13 shows the apparatus 1 according to the invention with six conductor rails 222. The conductors rails 222 have two terminal areas 225 in each case and can be connected to one another thereby as desired.

We claim:

1. An apparatus for making contact with a foil conductor, in particular of a solar module, comprising:

a housing having a first connecting region for connecting to the foil conductor and a second connecting region with at least one contact for connecting to at least one plug connector;

characterised in that at least one conductor rail is provided for connecting the contact to the foil conductor, the conductor rail has a contact region for detachable connection to the foil conductor, the contact region has a clamping spring that clamps the foil conductor between the clamping spring and the conductor rail, the conductor rail has a terminal area for receiving electronic modules or lead portions, and the conductor rail is connected to the contact.

2. The apparatus according to claim 1, wherein the first connecting region comprises a centering ring.

3. The apparatus according to claim 1, wherein the first connecting region is arranged on a base of the housing.

4. The apparatus according to claim 3, wherein the first connecting region has an opening in the base for the foil conductors to pass through.

5. The apparatus according to claim 1, wherein a gel seal is provided between the solar module and the first connecting region as a seal.

6. The apparatus according to claim 5, wherein the gel seal consists of a carrier element and a gel element.

7. The apparatus according to claim 5, wherein the gel seal consists of two partial seals between which the foil conductors extend.

8. The apparatus according to claim 5, wherein the first connecting region has spring elements which exert a pressure on the gel seal.

9. The apparatus according to claim 1, wherein the housing can be closed by a diaphragm cover, the diaphragm cover having a diaphragm that is moveable relative to the cover.

10. The apparatus according to claim 9, wherein the diaphragm cover is joined to the housing by a hinge.

11. The apparatus according to claim 9, wherein the diaphragm cover closes the housing in a sealing manner with a sealing lip.

12. The apparatus according to claim 9, wherein the diaphragm cover has an opening aid in the form of an undercut for inserting a tool.

13. The apparatus according to claim 9, wherein a covering cap is joined to the diaphragm cover for covering the second connecting region.

14. The apparatus according to claim 9, wherein an intermediate cover is provided between the housing and the diaphragm cover.

15. The apparatus according to claim 14, wherein the housing is filled to the intermediate cover with sealing compound.

16. The apparatus according to claim 14, wherein the intermediate cover latches on the housing.

17. The apparatus according to claim 14, wherein the terminal areas of the conductor rails are also accessible when the intermediate cover is closed.

18. The apparatus according to claim 14, wherein the intermediate cover has a sealing funnel.

19. An apparatus for making contact with a foil conductor, in particular of a solar module, comprising:

a housing having a first connecting region for connecting to the foil conductor and a second connecting region with a screw terminal area for making contact with at least one cable;

characterised in that at least one conductor rail is provided for connecting the screw terminal area to the foil conductor, the conductor rail has a contact region for detachable connection to the foil conductor, the contact region has a clamping spring that clamps the foil conductor between the clamping spring and the conductor rail, the conductor rail has a terminal area for terminally receiving electronic modules or lead portions, and the conductor rail is connected to the screw terminal area.

20. The apparatus according to claim 19, wherein the terminal area is designed as a screw terminal area.

21. An apparatus for making contact with a foil conductor in a solar module, comprising:

a housing having a first connecting region that receives the foil conductor and a second connecting region with a contact that connects to a plug connector;

a conductor rail having a first end connected to the contact, a second end connected to the foil conductor and a terminal area for receiving electronic modules or lead portions; and a spring element connected to the first connecting region, the spring element exerts pressure on a gel seal positioned between the solar module and the first connecting region.

22. The apparatus according to claim 21, wherein the first connecting region has a centering ring for aligning the first connecting region with the solar module.

23. The apparatus according to claim 21, wherein the gel seal includes a pair of partial seals between which the foil conductor extends.

24. The apparatus according to claim 21, wherein the gel seal includes a carrier element and a gel element.

\* \* \* \* \*